METHOD OF FORMING A RECTANGULAR HEAT DUCT

Original Filed Feb. 19, 1970 10 Sheets-Sheet 1

INVENTORS
LEROY E. ANDERSON
GERALD J. MUNN
BY Schroeder, Siegfried & Ryan
ATTORNEYS

METHOD OF FORMING A RECTANGULAR HEAT DUCT

Original Filed Feb. 19, 1970 10 Sheets-Sheet 8

INVENTORS
LEROY E. ANDERSON
GERALD J. MUNN
BY Schroeder, Siegfried & Ryan
ATTORNEYS

METHOD OF FORMING A RECTANGULAR HEAT DUCT

Original Filed Feb. 19, 1970 10 Sheets-Sheet 5

#4

#5

#6

INVENTORS
LEROY E. ANDERSON
BY GERALD J. MUNN
Schroeder, Siegfried & Ryan
ATTORNEYS

METHOD OF FORMING A RECTANGULAR HEAT DUCT

Original Filed Feb. 19, 1970 10 Sheets-Sheet 4

#7

#8

#9

INVENTORS
LEROY E. ANDERSON
BY GERALD J. MUNN

Schroeder, Siegfried & Ryan
ATTORNEYS

METHOD OF FORMING A RECTANGULAR HEAT DUCT

Original Filed Feb. 19, 1970 10 Sheets-Sheet 5

INVENTORS
LEROY E. ANDERSON
BY GERALD J. MUNN
Schroeder, Siegfried & Ryan
ATTORNEYS

METHOD OF FORMING A RECTANGULAR HEAT DUCT

Original Filed Feb. 19, 1970 10 Sheets-Sheet 6

INVENTORS
LEROY E. ANDERSON
BY GERALD J. MUNN
Schroeder, Siegfried & Ryan
ATTORNEYS

METHOD OF FORMING A RECTANGULAR HEAT DUCT

Original Filed Feb. 19, 1970 10 Sheets-Sheet 7

#4

#5

#6

INVENTORS
LEROY E. ANDERSON
GERALD J. MUNN
BY Schroeder, Siegfried & Ryan
ATTORNEYS

METHOD OF FORMING A RECTANGULAR HEAT DUCT

Original Filed Feb. 19, 1970 10 Sheets-Sheet 8

INVENTORS
LEROY E. ANDERSON
BY GERALD J. MUNN
Schroeder, Siegfried & Ryan
ATTORNEYS INVENTORS
LEROY E. ANDERSON
GERALD J. MUNN
BY
Schroeder, Siegfried & Ryan
ATTORNEYS

METHOD OF FORMING A RECTANGULAR HEAT DUCT

Original Filed Feb. 19, 1970 10 Sheets-Sheet 10

INVENTORS
LEROY E. ANDERSON
GERALD J. MUNN
BY Schroeder, Siegfried & Ryan
ATTORNEYS United States Patent Office Re. 28,088
Reissued July 30, 1974

28,088
METHOD OF FORMING A RECTANGULAR HEAT DUCT

Leroy E. Anderson and Gerald J. Munn, Detroit Lakes, Minn., assignors to Manufacturers Systems, Inc., Detroit Lakes, Minn.

Original No. 3,722,443, dated Mar. 27, 1973, Ser. No. 205,843, Dec. 8, 1971, which is a division of application Ser. No. 12,663, Feb. 19, 1970, now Patent No. 3,636,-903. Application for reissue June 6, 1973, Ser. No. 367,581

Int. Cl. B21d *39/02*

U.S. Cl. 113—54 34 Claims

Matter enclosed in heavy brackets [ ] appears in the original patent but forms no part of this reissue specification; matter printed in italics indicates the additions made by reissue.

ABSTRACT OF THE DISCLOSURE

A machine designed to continuously progress a pair of elongated flat sheets of metal longitudinally through a plurality of cooperative dies which progressively in sequential steps gradually shape the two sheets into a duct having a rectangular cross-sectional configuration. The machine utilizes cooperative rotary dies to shape and form the duct in a continuous operation to a length equal to that of the sheets so that rectangular ducts of any desired length can be produced in an automatic operation by merely inserting into the machine a pre-prepared roll comprised of a pair of sheets of metal of the desired length, the sheets entering the machine at one end and leaving the same at the other end in the form of a continuous rectangular duct.

This invention relates to heating ducts. More particularly, it relates to machines for forming elongated metal ducts having a rectangular cross-sectional configuration. This application is a divisional application of our copending application, Ser. No. 12,663, filed Feb. 19, 1970, and entitled "Rectangular-Duct Forming Machine," now U.S. Pat. No. 3,636,903.

There is a vast demand today for elongated metal ducts which are generally rectangular in cross-sectional configuration. This particularly true in the heating industry and especially true with respect to the manufacture of mobile homes. The manufacture of rectangular heating ducts has posed a substantial problem for a long time, particularly where the duct is to be quite extensive in length, as will be realized from the description hereinafter of the method by means of which such ducts have been formed.

The conventional manner of producing rectangular heating ducts has heretofore involved first the selection of a flat sheet of metal of the desired length of the heating duct, provided such length was not too great to make proper handling of the sheet possible. Where relatively long lengths of heating duct were required, such ducts were made in shorter sections and then subsequently secured together. This was particularly true where the ducts had to be transported from the location of manufacture to the location of installation. To manufacture the heating ducts, the flat sheet was formed with a male lock at one edge and a female lock at the opposite side edge, and thereafter the elongated sheet was bent simultaneously throughout its length to impart the rectangular shape and to bring the male and female edges together, preparatory to moving them into mating relation. The final step involved the insertion of the male into the female lock to lock the same to each other. Great difficulty has been experienced in assembling these locks, the main problem being the fact that the male or female edge is frequently bent inadvertently during the efforts involved in shaping the flatsheet into the desired rectangular shape, and, as a consequence, great difficulty is experienced in bringing the two edges into proper mating relation. The length of such sections is obviously limited because of these difficulties. Since a duct of any appreciable length must be assembled section by section if it is to be manufactured by the methods heretofore known, a great expenditure of time, effort, and materials is involved in the manufacture of ducts having appreciable length by these methods.

It is a general object of our invention to provide a machine constructed and arranged to continuously form an elongated duct having a rectangular cross-sectional configuration from a pair of flat sheets of metal fed into the machine simultaneously.

A more specific object is to provide a machine constructed and arranged to continuously progress a pair of elongated sheets of flat metal through the machine and automatically form therefrom, in continuous progression, a duct having a rectangular cross-sectional configuration.

A more specific object is to provide a novel machine having a plurality of cooperating rotary dies mounted in spaced relation along the length of a supporting frame and adapted to receive and progressively shape along their length a pair of elongated flat sheets of metal, in sequential steps, into a duct having a rectangular cross-sectional configuration.

Another object is to provide a machine constructed and arranged to receive and continuously progress a pair of elongated flat sheets of metal therethrough, the sheets being formed by and leaving the machine continuously in the form of a duct having a rectangular cross-sectional configuration, the forming of the duct being accomplished through a series of partial progressive bending steps accomplished sequentially through the use of rotary dies at points spaced along the length of the sheets while they are passing through the machine.

Another object is to provide a novel machine constructed and arranged to enable a duct manufacturer to rapidly and efficiently produce elongated ducts of rectangular cross-sectional configuration of any predetermined length by merely feeding into the machine a pair of flat sheets of metal pre-cut to the same predetermined length.

Another object is to provide a novel machine constructed and arranged to manufacture rectangular ducts of any predetermined length at a very substantial saving in time, labor and costs.

Another object is to provide a novel machine constructed and arranged to manufacture rectangular ducts automatically at great saving, the machine itself being compact, automatic in operation, inexpensive to manufacture, trouble-free in operation, and inexpensive and simple to operate and maintain.

Another object is to provide a portable machine which permits users of rectangular ducts such as mobile home manufacturers to manufacture their ducts needs in single sections of desired length, whatever they may be, at their operations base, to thereby eliminate the need for transporting preformed tubular sections thereto.

Another object is to provide a novel machine which constructs rectangular tubular ducts from pairs of flat sheets of metal in an automatic operation which produces an end product having improved quality and performance characteristics.

Another object is to provide a machine which automatically constructs rectangular ducts from pairs of flat sheets of metal and which obviates the heretofore need of forming such ducts by bending the material from which the duct is to be made simultaneously throughout its length and which obviates the great difficulties heretofore encountered in assembling the male and female locks utilized in the known conventional manufacturing methods of ducts so shaped.

These and other objects and advantageous of our invention will more fully appear from the following description, made in connection with the accompanying drawings, wherein like reference characters refer to the same or similar parts throughout the several views, and in which.

Figure 1:
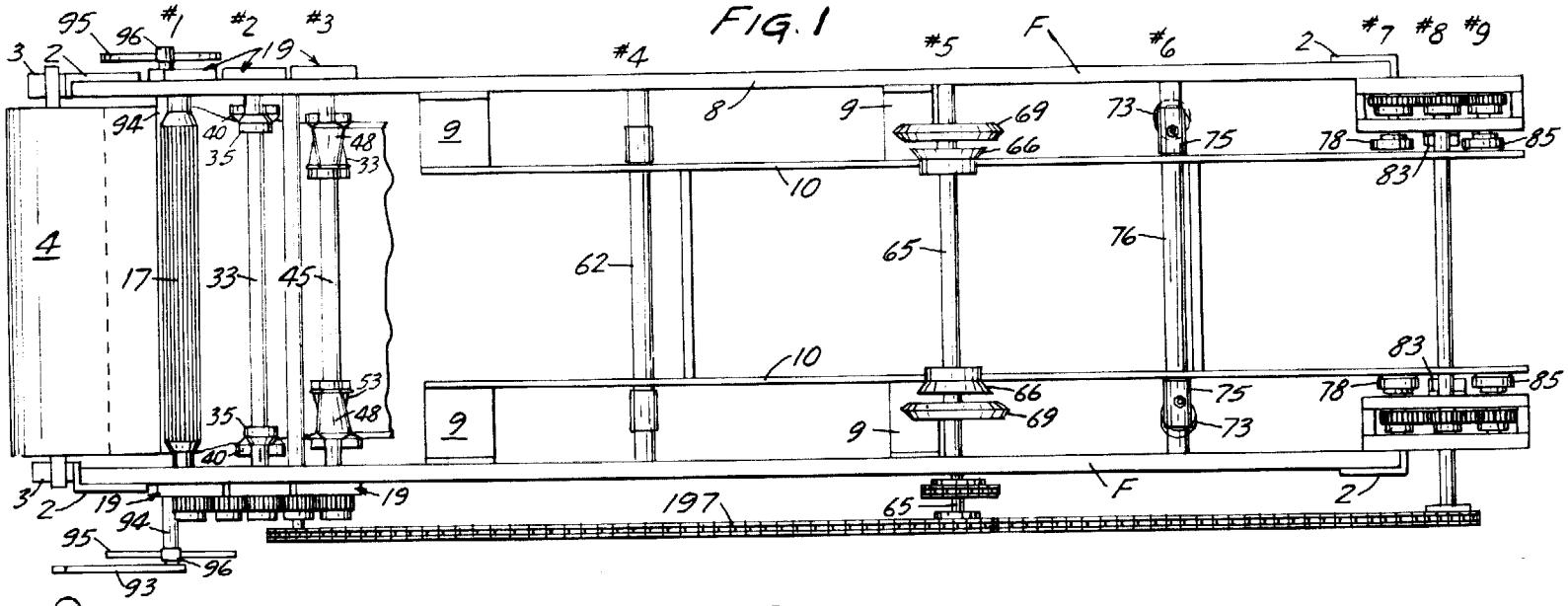
FIG. 1 is a diagrammatic plan view of the preferred form of our invention with stations indicated thereon and without the seam flattening mechanism being included.

The preferred embodiment, as shown in FIGS. 1–16, include a movable frame F which is adapted to be moved to a desired location through the use of rollers 1 at the lower end of a plurality of vertically extending supports 2. A cradle 3 rotatably supports a single roll 4 of a pair 5 and 6 of metal sheets. These sheets are arranged in superimposed contiguous relation with each other and rolled into a single roll so that their convolutions are concentric. The upper sheet 5 is slightly wider than the lower sheet 6 and, as can be best seen in FIG. 3, they enter the feeding and initial crimping mechanism, indicated generally by the numeral 7, in vertically spaced relation as they unwind from the roll 4.

The frame F is elongated and has a pair of vertically extending side members 8 which are transversely spaced from each other and carry support brackets 9, which in turn carry elongated transversely spaced fixed inner die members 10. These fixed inner die members 10, as shown in FIGS. 6–9, are comprised of elongated flat metal plates which protrude forwardly beyond the brackets 9 a substantial distance, which can be seen by reference tc FIG. 1.

Figure 29:
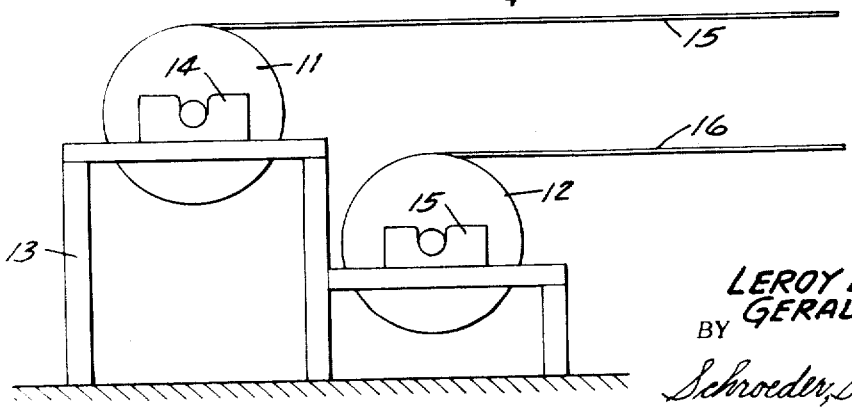
FIG. 29 is a diagrammatic fragmentary side elevational view of a dual cradle mechanism which may be carried by the frame to support two separate rolls of sheet metal in feeding relation to either of the duct forming mechanisms in lieu of a single composite roll comprised of a pair of such sheets.

If desired, a pair of separate rolls 11 and 12 (see FIG. 29) of sheet metal may be utilized in lieu of the single composite roll 4. In that event, the rolls 11 and 12 are rotatably supported similarly to the roll 4 upon a composite cradle 13, which utilizes saddles 14 and 15 to rotatably support the shafts on which the rolls are carried. When dual rolls 11 and 12 are utilized, the upper sheet 15 is fed into the machine in vertically spaced relation to the lower sheet 16, as shown.

FIG. 1 shows the preferred embodiment of our duct forming machine with the various stations to be hereinafter referred to indicated thereon along the length of the machine. It will be noted that station No. 1 is positioned immediately adjacent the roll 4. This station No. 1, which is shown in greater detail in FIG. 3, utilizes a feeding and initial crimping mechanism 7 which includes an upper set of rotary die members 17 and 18, the upper one of which is rotatably mounted so as to be capable of vertical movement relative to the lower rotary die 18. To permit such movement, each end of the die member 17 is rotatably mounted in a spring loaded bearing structure 19 at each of its ends, the details of which are clearly shown in FIG. 14. Thus, the upper roller 17 is constantly urged downwardly by the action of spring members 20 which press the vertically slidable mounting block 21 and the shaft of the roller 17 downwardly toward engagement with the lower die 18, which is mounted for rotation about a fixed axis upon the frame F.

The upper roller 17 has tapered metal end portions 22 and a major intermediate portion 23, which is formed of a firm but resilient material. The lower metal roller 18 has enlarged end portions characterized by a bevelled surface 24, which is complementary to the bevelled surface 22 of the upper roller 17, and a flat angular surface 25 which extends parallel to and bears against the cylindrical end portion of the roller 17, so that when the two rollers 17 and 18 are brought together these surfaces will function as cooperative rotary dies.

The outer surface of the roller 18 is characterized by a plurality of angular radially outwardly extending circumferential beads 26, which are spaced longitudinally of the roller 18 and a pair of longitudinally and outwardly extending ribs 27. These ribs 7 extend parallel to the axis of the roller 18 and are carried at its circumferential surface and are disposed at opposite sides of the roller.

The lower set of cooperating rotary dies are adapted to receive and progress the lower sheet of metal through the machine and they are the counterpart of the rollers 17 and 18. The lower roller 28 of this set is constructed similarly to the roller 17 and is similarly mounted for rotation and vertical movement in similar movable bearings, except that they are inverted so as to constantly urge the roller 28 upwardly toward the cooperative rotary die 29 which, like the die 18, is mounted for rotation about a fixed axis on the frame F.

The rotary die 29 has angular beads 30 similar to the beads 26 and longitudinally extending ribs 31 similar to the ribs 27. It also has a bevelled surface 32 similar to the surface 24, but, as shown, it has no surface comparable to the angular die surface 25. The relatively narrow lower sheet 6 obviates any need for such a surface. The rotary gripping members 17 and 28 are adjusted relative to the rotary die members 18 and 29 through the use of a control system indicated generally by the letter C, which will be described in greater detail hereinafter.

When the two sheets of metal from the roll 4 have been inserted between the members 17, 18 and 28, 29, they will be progressed thereby through the remainder of the machine, since they are each power driven, as will be hereinafter described. The longitudinal ribs 27 and 31 and the angular beads 26 and 30 impart or form ribs on the surface of the flat sheets and provide added rigidity thereto. The cooperative bevelled surfaces 22 and 24 form a 30° Bend of the lateral or edge portions of the sheet 5, and the angular surface 25 shapes the extreme edge portions so as to extend parallel to the main body of the sheet, as will be readily appreciated by reference to FIG. 3. This is the initial step in progressively forming the outermore lateral portions of the upper sheet into a sealing element which will ultimately become a portion of the seam. At the same time, the rotary die 29 imparts a bend to the narrower lower sheet 6, at its extreme edge, of a 30° angle, there being no edge portion left extending parallel to the main body of the sheet 6, since the sheet is narrower. Thus the extreme edge portion of the sheet 6 is bent downwardly and away from the sheet 5, just as the lateral portions of the sheet 5 are bent away from the sheet 6.

Figure 4:
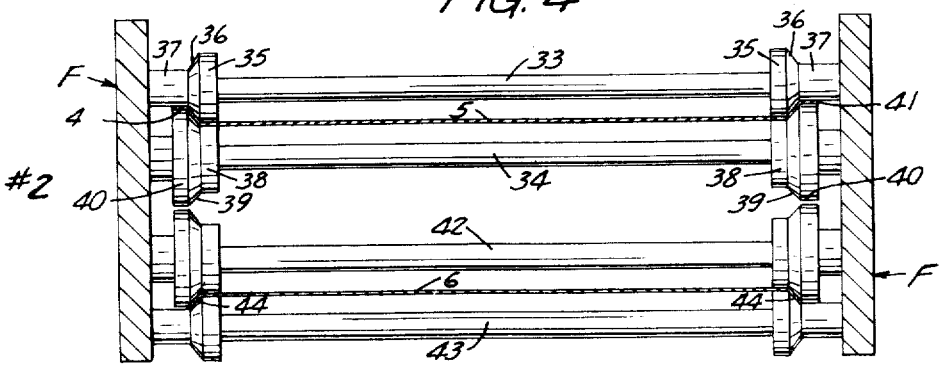
FIG. 4 is a diagrammatic vertical sectional view taken through the embodiment shown in FIG. 1, at station No. 2, and illustrating how the outermore lateral portions of the two sheets are shaped preliminarily toward becoming cooperative seam elements.

From station No. 1, the two sheets 5 and 6 move to station No. 2, at which location it enters the second stage of the duct forming operation. At this location, as shown in FIG. 4, there is positioned a second pair of vertically spaced sets of cooperating rotary dies to impart further shaping of the lateral portions of the sheets 5 and 6, so that the seaming elements will extend at a 60° angle relative of the main body of the sheets. At this station there is located an upper set of rotary dies, identified by the numerals 33 and 34. Each of these dies consists of a shaft rotatably mounted in the frame F and carrying a rotary die member at each of its ends and shaped so as to be complementary and cooperate with the die member of the other. Thus the rotary die 33 has at each of its ends a die member having a flat annular surface 35 and a bevelled 60° surface 26 and an enlarged cylindrical surface 37. The die 34 has at each of its ends a rotary die having an annular surface 38 and a 60° bevelled surface 39 and an enlarged cylindrical surface 40. As clearly shown in FIG. 4, the surface 35 cooperates with the surface 38 and the surface 36 cooperates with the surface 39 to impart a 60° angle to the sealing element, and the surface 37 cooperates with the cylindrical surface 40 to maintain the very edge portion or lip 41 parallel to the main body of the sheet 5.

The lower set of rotary dies, indicated generally by the numerals 42 and 43, are similarly mounted and arranged, the die 42 being constructed identically with the die 34. The lower rotary die 43 is constructed identically with the upper rotary die 33, and they cooperate to impart a 60° angle to the sealing element 44 at the very edge of the lower sheet 6.

Figure 5:
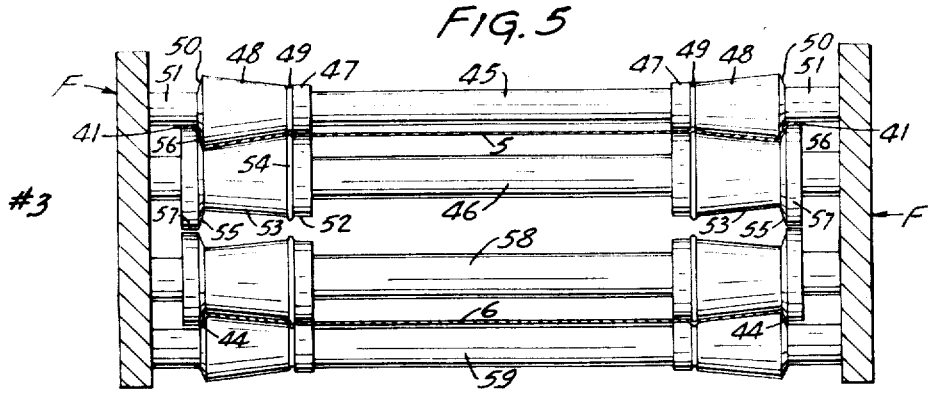
FIG. 5 is a diagrammatic vertical sectional view taken through the embodiment shown in FIG. 1, at station No. 3, and illustrating the manner in which the innermore lateral portions of the two sheets are crimped preliminarily to bending each sheet into oppositely facing channel members and the outermore lateral portions are shaped finally into seam elements.

From station No. 2, which is shown in FIG. 4, the sheets 5 and 6 are progressed to station No. 3, at which location there is disposed another group of vertically spaced sets of driven rotary dies, mounted for rotation upon the frame F and spaced transversely thereof. As shown in FIG. 5, the upper set is comprised of a pair of cooperating rotary dies identified generally by the numerals 45 and 46. These dies consist of elongated shafts rotatably mounted upon the frame F and carrying at each of its ends a cooperating rotary die member constructed and arranged to impart additional shaping to the lateral portions of the sheets 5 and 6, preparatory to forming a rectangular duct therefrom. The rotary die 45 has a die member at each of its ends, which has an annular surface 47 separated from an outwardly tapering surface 48 by an annular groove 49. At the larger end of this die is an essentially flat surface 50, which extends essentially normal to the shaft upon which these die members are mounted, and a reduced annular surface 51 is provided outwardly thereof.

The die 46 carries at each of its ends a cooperative rotary die member characterized by an annular surface 52 separated from an outwardly diminishing frustoconical surface 53 by an annular rib 54, which is positioned to extend into the groove 49 as the die members rotate. This die member is further characterized by a surface 55 which extends essentially normal to the shaft of the die 46 and is positioned slightly outwardly of the surface 50 so as to cooperate therewith to impart a 90° angle to the seam element 56. It is further characterized by an enlarged annular surface 57, which cooperates with the cylindrical surface 51 to cause the lip 41 to extend essentially normally to the sealing element 56.

The lower set of rotary dies, identified by the numerals 58 and 59, are similarly constructed and arranged to shape the lower sheet 6. The rotary die 58 is constructed identically with the rotary die 46, and the rotary die 59 is constructed identically to the rotary die 45, and they cooperate in a similar manner to impart the same shape to the lateral portions of the sheet 6, except, of course, that the extreme edge portion, or sealing element 44, carries no lip element corresponding to the lip element 41 because of its narrower width.

Figure 6:
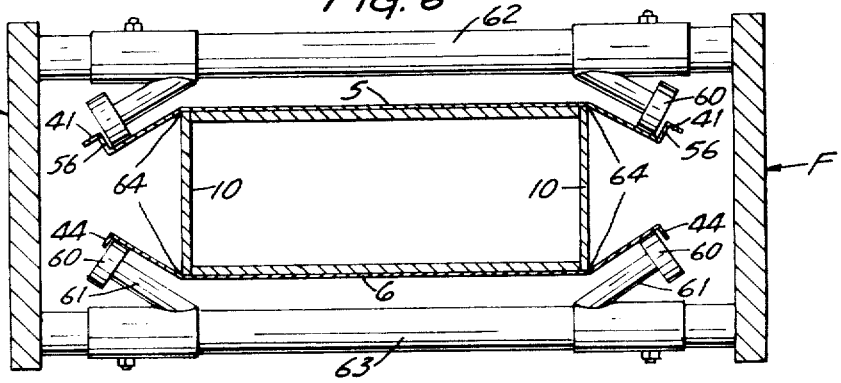
FIG. 6 is a diagrammatic vertical sectional view taken through the embodiment shown in FIG. 1, at station No. 4, and illustrating the manner in which the lateral portions are guided inwardly at the bead line about the fixed die and into the adjacent and following rotary die members.

From station No. 3, which is shown in FIG. 5, the sheets move to station No. 4 at which they encounter the structure shown in FIG. 6. At station No. 4, the sheets reach a helper station at which they are guided inwardly by a plurality of rotatably mounted rollers 60, each of which is carried by a spindle or shaft 61 and is supported upon one of transverse members 62 or 63 as shown in FIG. 6. It is at this station that the sheets 5 and 6 first encounter the fixed die member 10, which are positioned so as to be disposed just inwardly of the break lines 64, which were imparted to the two sheets by the cooperative action of the annular ribs 54 and grooves 49 of station No. 3, as shown in FIG. 5. It will be noted that the rollers 60 are positioned so as to engage the lateral portions of the sheets 5 and 6 just inwardly of the sealing element. These rollers 60 are not driven, but are free to rotate on the shaft 61, which in turn are adjustably mounted on the transverse members 62 and 63 through the use of sleeves as shown. These rollers 60 guide the lateral portions of the sheets 5 and 6 inwardly toward each other so as to progressively break the sheets at the break line 64 and guide them into the rotary dies at station No. 5, which are shown in FIG. 7.

Figure 7:
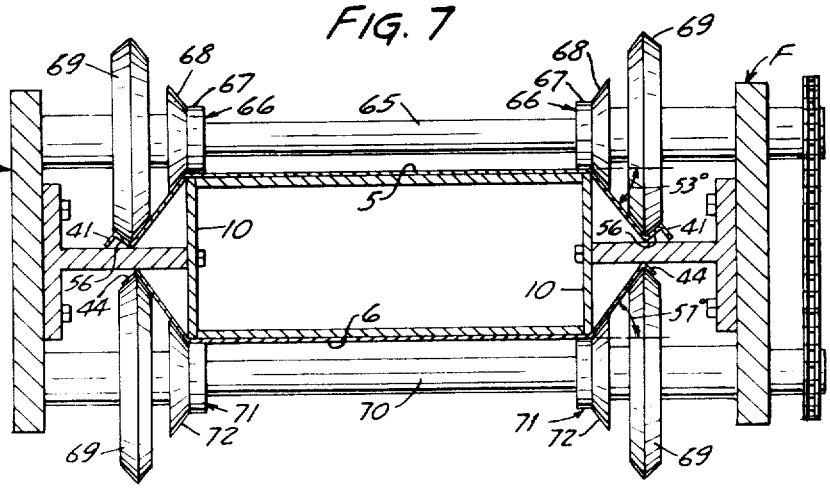
FIG. 7 is a diagrammatic vertical sectional view taken through the embodiment shown in FIG. 1, at station No. 5, and illustrating the manner in which the rotary dies cooperate with the fixed die at the bead line and present the outermore lateral portions of the lower sheet toward the corresponding portions of the upper sheet.

FIG. 7 shows a plurality of driven rotary dies cooperating with the fixed dies 10. A power driven upper shaft 65 is rotatably mounted upon the frame F to extend transversely thereof and carries at each of its end portions a rotary die member 66 having a cylindrical surface 67 and a 53° outwardly bevelled surface 68. Each of these rotary die members 66 are positioned so that the cylindrical surface 67 bears upon the upper sheet 5 just inwardly of outer surface of the fixed die member 10 and the bevelled surface is disposed just outwardly thereof so as to bring the lateral portions of the sheet member 5 inwardly 53° from the plane of the sheet. The shaft 65 also carries at each end a disk-shaped guiding member 69, which rotates with the shaft and extends into the angle formed by the sealing element 56 so as to guide the outermore lateral portions of the sheet inwardly toward the sheet 6, as shown in FIG. 7.

A lower and similarly mounted shaft 70 carried identically constructed guide members 69 and a pair of rotary die members 71, which are constructed and positioned similar to the rotary die member 66, except that the angle of the bevel 72 is such as to impart a 57° angle to the lateral portions of the sheet 6 and thus move the sealing element 44 inwardly at each side to an extent farther and ahead of the sealing element 56 of the sheet 5. This arrangement is utilized in order to insure that upon further movement of the lateral portions of the two sheets inwardly the sealing elements will mate properly.

Figure 8:
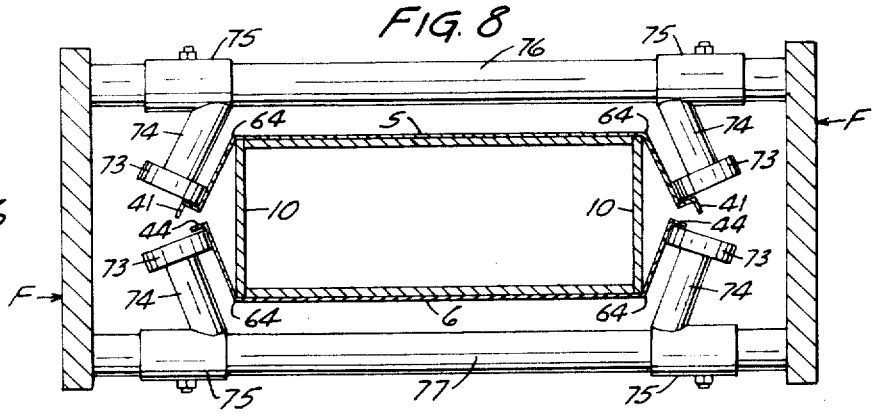
FIG. 8 is a diagrammatic vertical sectional view taken through the embodiment of FIG. 1, at station No. 6, and illustrating the manner in which the guide rollers bend the lateral portions of the sheets further inwardly about the bead line and present the lower seam elements to the upper seam elements at an inwardly disposed position to facilitate subsequent inter-engagement.

From station No. 5, as shown in FIG. 7, the sheets 5 and 6 move onwardly to station No. 6, which is shown in FIG. 8. Here again, the sheets encounter a helper station in the form of rollers 73, each of which is rotatably mounted for free rotation about a spindle 74 that is carried by a sleeve 75 upon a transverse member such as 76 or 77. These rollers 73 guide the lateral portions of the sheets 5 and 6 further inwardly as they bend further at the break lines 64. It will be noted that the rollers 73, which are carried by the lower transverse member 77, are positioned inwardly slightly farther than those carried by the upper member 76 so that the sealing element 44 is disposed somewhat inwardly of the sealing element 56 and the lip 41 at each side of the machine. Note that the two sheets 5 and 6 have been gradually and progressively formed in sequential steps into two oppositely facing channel members which are essentially U-shaped in cross-sectional configuration. As these sheets continue to progress through the machine, even further bending takes place until a truly rectangular configuration is obtained. The effect of the rollers 73 is felt by the material of the sheets 5 and 6 which is disposed thereahead so that the sheets are properly guided into the mechanism at station No. 7, which is shown in FIG. 9.

At station No. 7 there is provided a plurality of rotary die members constructed and arranged to close the rectangular configuration and commence to close the lip 41 around the sealing elements 44 so as to hold the latter between it and the sealing element 56. Carried by the frame F at opposite sides of the fixed dies 10 and cooperating therewith is a pair of rotary die members which are identical in construction and identified generally by the numeral 78. Each of these rotary die members 78 has a cylindrical compressing surface 79 and a slightly bevelled inner end surface 80. The latter gradually bends the lateral portions of the sheet 5 inwardly to a 90° angle against the fixed die and at the same time the cylindrical surface 79 brings the sealing element 56 and the lip 41 downwardly and around the relatively inwardly disposed sealing element 44. A pair of rotary die members indicated generally by the numeral 81 is also carried by the frame F in position to cooperate with the rollers 78 and toward that end they are constructed to provide a bevelled camming surface 82, which engages the lip 41 and brings it inwardly to an angulated position relative to the sealing element 56 and somewhat around and below the sealing element 44 of the sheet 6. Thus the construction shown completes the 90° bend at the side of the duct and commences the closing of the seam member which ultimately consists of the two sealing elements 44 and 56 held in sealed position by the sealing element 41, as will be hereinafter described. It will be noted that the two rotary die members 81 are positioned at opposite sides of the fixed die members 10 and have similar bevelled inner ends which complete the 90° bend of the sheet 6 at the break line 64 in addition to commencing the closing of the seam.

Figure 9:
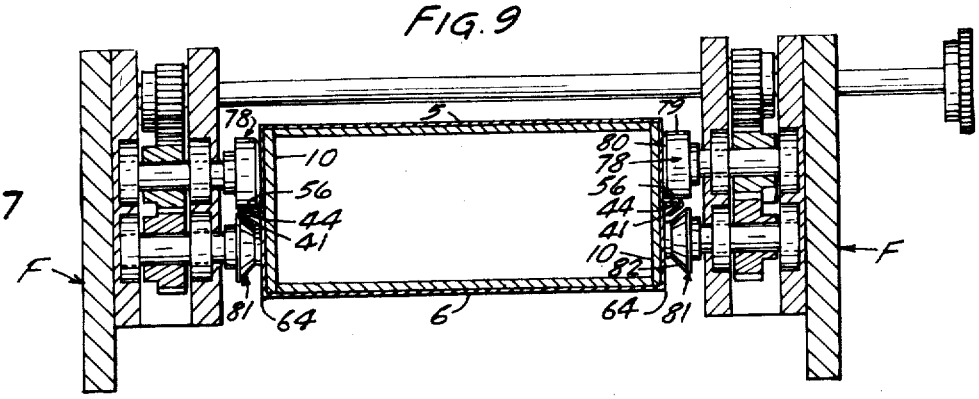
FIG. 9 is a diagrammatic vertical sectional view taken through the embodiment shown in FIG. 1, at station No. 7, and illustrating the manner in which the cooperative rotary members complete the bend at the bead lines to 90° and commence closing the same.
Figure 10:
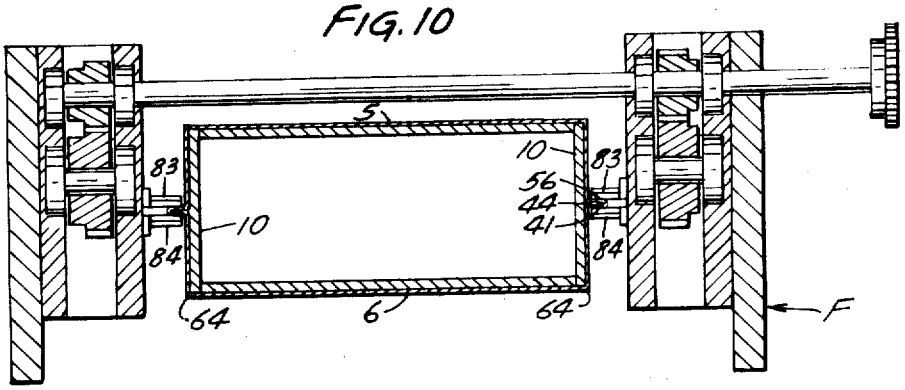
FIG. 10 is a diagrammatic vertical sectional view of the embodiment shown in FIG. 1, taken at station No. 8, and illustrating the cooperative camming members closing the seam by camming the overlying seam lip of the upper sheet into parallel and underlying relation to the edge portions of the lower sheet.

From position 7 as shown in FIG. 9, the sheets 5 and 6 move to station No. 8, at which they encounter the structure shown in FIG. 10. At this station there is provided at each of the sides of the now rectangular configuration additional camming structure constructed and arranged to complete the formation of the seam. As shown in FIG. 10, mounted upon the frame F outwardly of the fixed dies 5, and in position to receive therein the seam elements 44 and 56 and the lip 41, is a pair of camming members 83 and 84. These camming members 83 and 84 are fixed and vertically spaced from each other a distance essentially equal to the combined thickness of the elements 41, 44 and 56. The end portions of the camming members 83 and 84 which face toward the direction from which the sheets 5 and 6 move are somewhat flared as shown in the detailed view of FIG. 14 to facilitate entrance of these elements thereinto. As the sheets 5 and 6 are drawn past station No. 8, the seam which is now comprised of the seam elements 44 and 56 and the lip 41 is completed, the lip 41 being brought into flattened position around and below the sealing element 44 of the lower sheet 6. Elements 83 and 84 are provided at each side of the duct so that as the sheets pass thereby the seam is completed to the configuration shown in FIG. 10.

Figure 11:
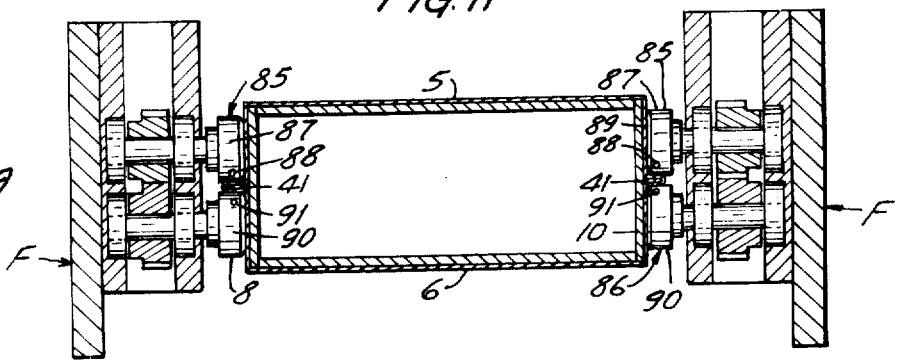
FIG. 11 is a diagrammatic vertical sectional view taken through the embodiment shown in FIG. 1, at station No. 9, and illustrating the finishing operation in which the seam is compressed and buttoned to positively lock the seam elements together.
Figure 16:
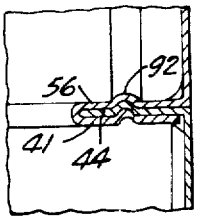
FIG. 16 is a detailed diagrammatic view, shown on an enlarged scale, of the buttoning operation of the rotary dies shown in FIG. 11.

As the now rectangular configuration comprised of the sheets 5 and 6 leave station No. 8 as shown in FIG. 10, it proceeds to station No. 9, which is shown in FIG. 11. At this station the seam at each side of the duct, which consists of the elements 41, 44 and 56 in flattened condition, passes through one of a pair of vertically spaced rotary die members 85 and 86, one each of which is disposed at each side of the duct. Each of the rotary die members 85 is characterized by a cylindrical surface 87, which bears against the outer surface of the sealing element 56 and a pair of recesses 88 which are oppositely disposed within said cylindrical surface. A bevelled end surface 89 is also provided to facilitate movement of the rectangular duct thereby. Each of the rotary die members 86 is characterized by a cylindrical surface 90 which bears against the underside of the sealing lip 41 and compresses the latter to flatten the seam and compress it. Each rotary die member has a pair of outwardly extending buttons 91 which are positioned so as to pass directly opposite the recesses 88 as they rotate, and thus impart a locking button 92 at spaced locations approximately 3 inches apart along the seam to the metal of the elements 41, 44 and 56, which make up the seam. This button 92 positively locks the elements which make up the seam to each other and precludes separation during subsequent handling of the duct. An enlarged detailed view of the button being formed is shown in FIG. 16.

Figure 12:
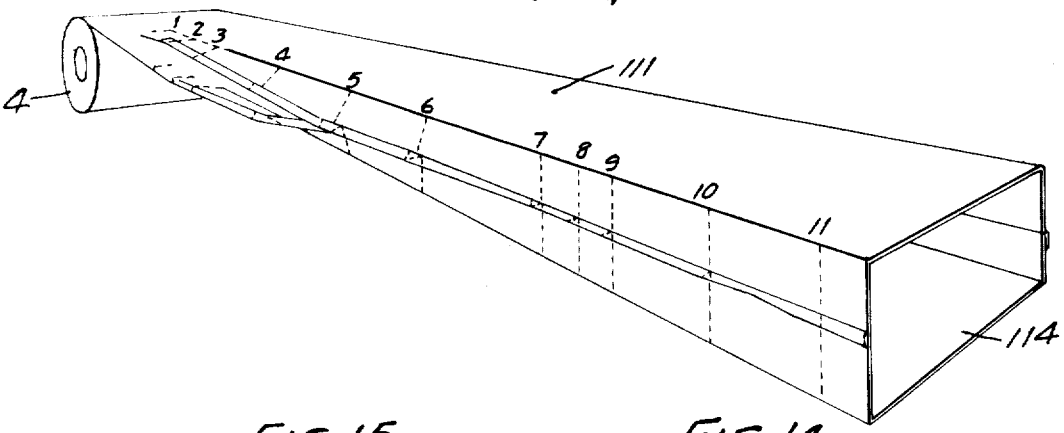
FIG. 12 is a diagrammatic perspective view illustrating how the two flat sheets are taken from a single roll by the embodiment shown in FIG. 1 and progressively formed into a duct having a rectangular cross-sectional configuration, the respective station numbers being indicated thereon at the point at which the two sheets take the shapes indicated thereat.
Figure 15:
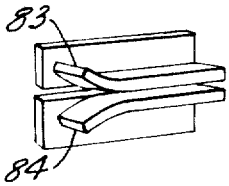
FIG. 15 is a diagrammatic detailed perspective view of the seam camming members shown in FIG. 10.
Figure 14:
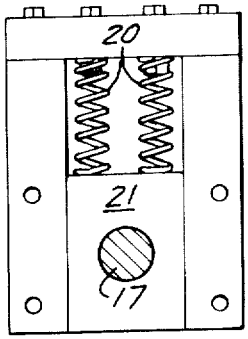
FIG. 14 is a diagrammatic side elevational view showing the spring loading provided for the upper set and lower set of rollers of the feeding mechanism and initial forming dies of station No. 1.

FIG. 12 shows a diagrammatic perspective view which illustrates the manner in which the individual sheets of the roll 4 gradually move therefrom through the machine and assume in sequential steps the shape which is illustrated at the locations identified thereon by numerals corresponding to the stations hereinbefore described. Thus it can be seen that the two flat sheets of metal 5 and 6 are progressively converted from flat sheets into a duct having a rectangular cross-sectional configuration as these sheets are drawn through the machine, the duct entering the machine at one end in the form of two sheets and being discharged from the opposite end in the form of a continuous rectangular duct which can be constructed of any desired predetermined length merely by providing a roll having two such sheets 5 and 6 of such desired length.

Figure 3:
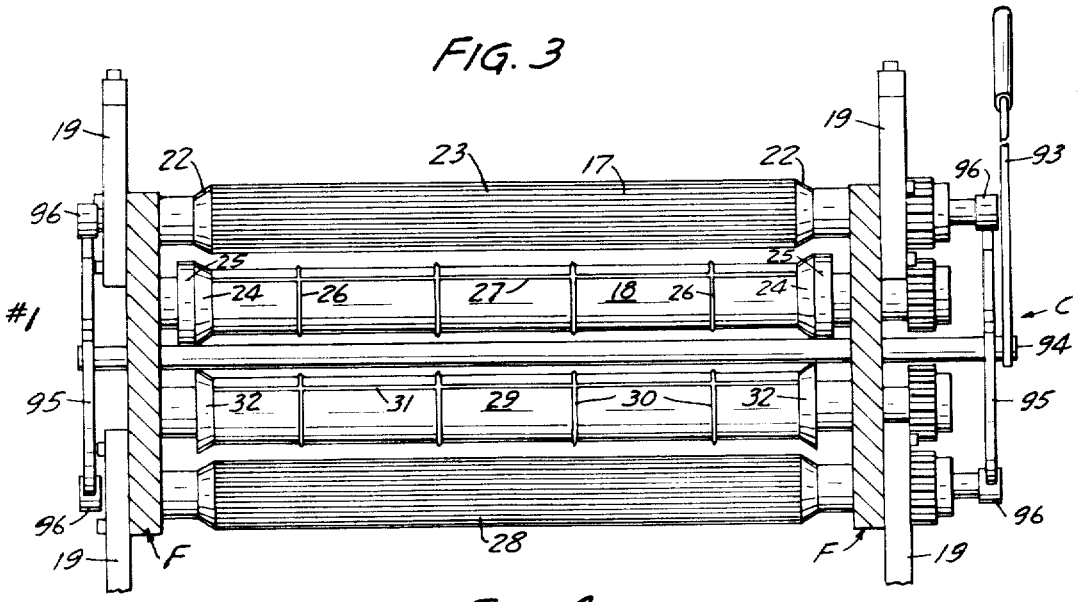
FIG. 3 is a diagrammatic vertical sectional view taken through station No. 1 of the embodiment shown in FIG. 1.
Figure 13:
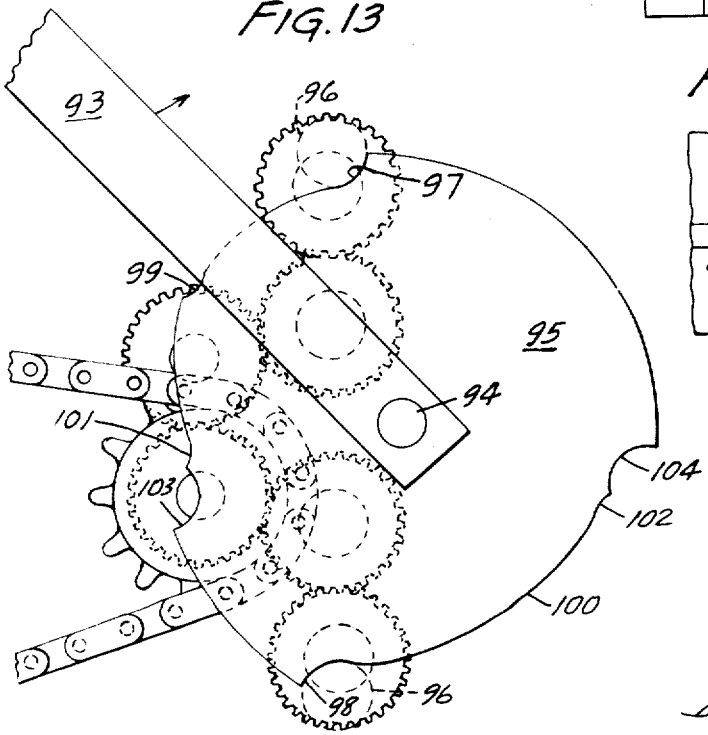
FIG. 13 is a diagrammatic side elevational view of the controls for the feeding mechanism and initial forming rollers at station No. 1.

The feeding and initial crimping mechanism shown in FIG. 3 and identified by the letter C is controlled through a handle member 93 which is fixedly connected to rotate with a transverse shaft 94 which is rotatably mounted and extends through the frame F. At each end of the shaft 94 there is a cam member 95, the details of which are shown in FIG. 13. These cams 95 are fixed to the shaft 94 and rotate therewith, and they have an irregular camming surface designed to control the relative movement of the members 17 and 28 toward and away from the rotary die members 18 and 29. This is accomplished through the use of rollers or cam followers 96, which are carried at each end of the members 17 and 28. Reference to FIG. 13 will disclose the irregular camming surface of the cams 95.

The lever 93 and cam 95 are positioned in FIG. 1 so as to present the camming surfaces having the maximum radius to the cam followers 96. This position is identified as position No. 1 and, since the camming surfaces 97 and 98 having the largest radius engage the cam followers 96 in this position, the upper roll 17 and the lower roll 28 will be positioned in open position and in nonengaging relation to the rolls 18 and 29. While in this position the forward end of the lower sheet of metal 6 is inserted between the rolls 28 and 29 and the lever member 93 and the cams 95 are rotated about the shaft 94 to position No. 2, which is at the camming surfaces identified by the numerals 99 and 100. It will be noted that the distance from the center of shaft 94 to the camming surface 99 is essentially equal to the distance between that shaft and the camming surface 97 at position No. 1 and hence the upper roll 17 will remain in open position. On the other hand, the distance from the center of shaft 94 to the camming surface 100 is substantially less than that between that shaft and the camming surface 98 at position No. 1 and hence the roll 28 will be moved by the springs 20 into engagement of the forward end of the lower sheet 6 to grip the same in cooperation with the roll 29.

One the sheet 6 has been gripped between the rolls 28 and 29, the lever 93 and cams 95 may be rotated further until the camming surfaces identified by the numerals 101, 102 bear against the cam followers 96. This is known as the rest position in which the rolls 28 and 29 are closed and the rolls 17 and 18 are also closed. This is true because it will be seen that the distance from shaft 94 to camming surface 102 has been reduced sufficiently so that roll 17 is permitted to lower and grip the forward end of the upper sheet which is extended therebetween manually just prior to movement of the lever to rest position, or position No. 3. Further movement of the lever 93 sufficient to cause the camming surfaces identified by the numerals 103 and 104 to engage the cam followers 96 (position No. 4) leaves the rolls 17 and 18 and 28 and 29 in position holding the sheets 5 and 6 in the same manner as in position No. 3, but also closes an electrical switch which causes the driving motor of the machine to be activated and rotate the rolls 17, 18, 28 and 29 to cause the sheets 5 and 6 to be progressed through the machine.

In the event a flattened seam is desired, the frame F may be constructed of sufficient length to also carry the mechanisms shown in FIGS. 30–32, which will be described hereinafter. Description of the structure will be made hereinafter subsequent to the description of the structures shown in FIGS. 17–29 inclusive.

FIGS. 17–29 illustrate a similar machine to that shown in FIGS. 1–16, except that the dies are constructed and arranged to form the seams at the corners of the rectangular duct rather than at the intermediate portions of the sides of the duct. The same cradles may be utilized as desired, but the roll of metal will be comprised of sheets of different widths as is shown in FIGS. 17–28.

The same type of feeding and initial crimping mechanism may be utilized except that the rolls will be constructed differently. Thus in FIG. 17, station No. 1 is shown wherein the vertically movable roll 110 is substantially shorter so as to conform to the narrower widths of the upper metal sheet 111. The roll 110 is provided with a resilient intermediate portion and metal end portions comparable to the construction of the roll 17. The cooperating roll 112 is constructed similarly to the roll 18, except that it, too, is shorter to conform to the narrower width of the upper sheet 111. The lowest roll 113 is constructed similarly to roll 28, but it is longer in length to conform to the substantially greater width of the lower sheet 114. The upper of the lower set of rolls 115 is constructed in the same manner as roll 29, except that it, too, has a substantially greater length to conform to the greater width of lower sheet 114. The rolls 110, 112, 113, and 115 form the same functions of gripping and moving the sheets forwardly as do the rolls shown in FIG. 3. The rolls 113 and 115 form a 30° angle of the edge portion of the sheet 114 in the same manner as the rolls 28 and 29 function. Since the rolls 110 and 112, however, do not have a bevelled end portion 22, the only effect these rolls have upon the upper sheet 111 is to impart the transverse and longitudinal ribs to the sheets to provide added rigidity in the same manner that the beads 26 and ribs 27 function upon the sheet 5.

Figure 17:
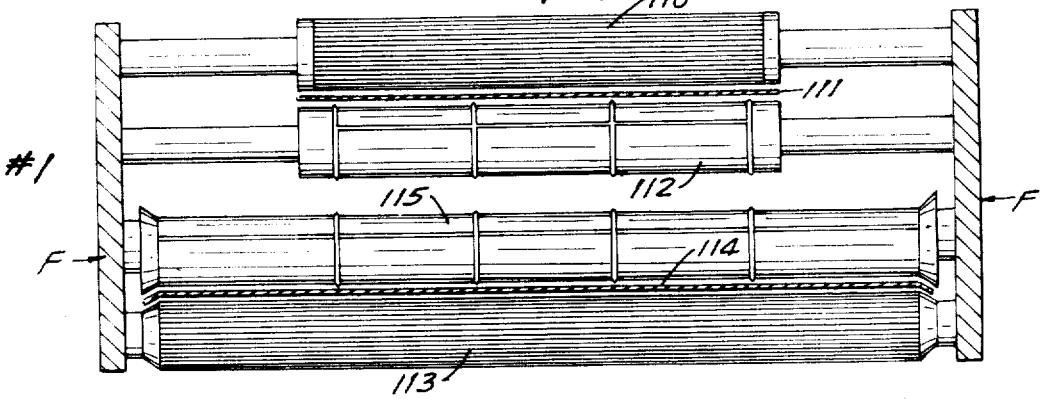
FIG. 17 is a diagrammatic vertical sectional view of a rectangular-duct forming machine constructed similarly to the embodiment shown in FIGS. 1–16, with the exception that its dies are constructed and arranged to form the seams at the corners of the duct rather than at a point intermediate the corners, the view being taken at station No. 1 with the rollers in separated position.
Figure 18:
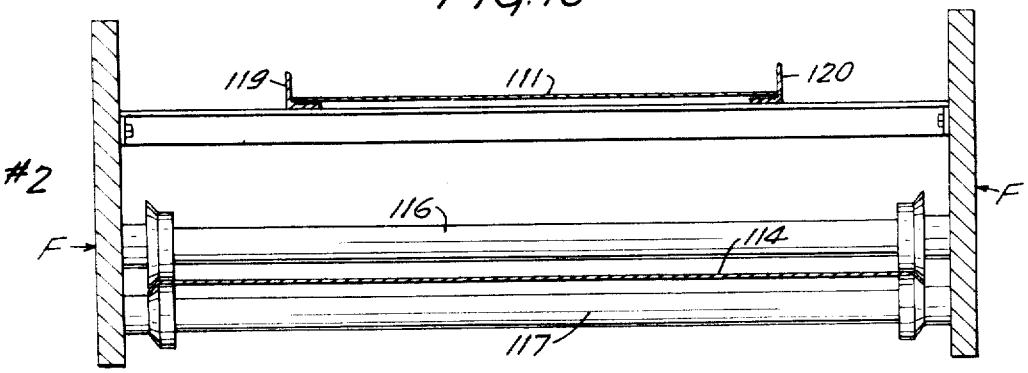
FIG. 18 is a diagrammatic vertical sectional view of the embodiment identified in the description of FIG. 17 and taken at station No. 2 thereof.
Figure 19:
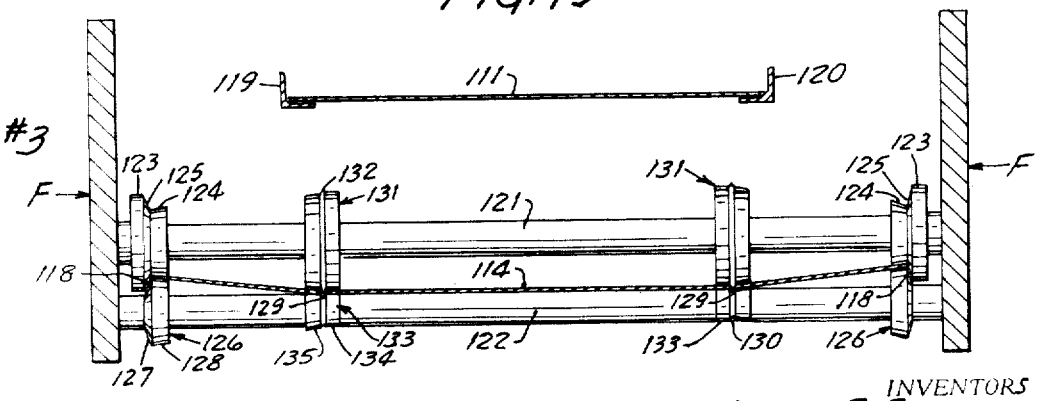
FIG. 19 is a diagrammatic vertical sectional view taken at station No. 3 of the embodiment identified in the description of FIG. 17 and illustrating the forming of the 90° lip at the extreme lateral portions of the wider sheet and the initial break at the innermore lateral portions thereof.

FIG. 18 shows station No. 2 of the modified form of the invention. As the sheets pass through station No. 1, as shown in FIG. 17, they enter the structure shown in FIG. 18 for further modification corresponding to that which takes place in station No. 2 of the preferred embodiment. Thus, the rolls 116 and 117 correspond to rolls 42 and 43, and similarly impart a 60° angulation to the seal element 118 at each of the lateral edges of the sheet 114. The sheet 111 enters a pair of guiding channels 119 and 120 which are supported by the frame F and extend longitudinally thereof at the central position shown. No modification of sheet 111 takes place at station No. 2, and the only modification to sheet 114 is to impart a 60° angulation to the sealing element 118 and progress the sheet forwardly to station No. 3, which is shown in FIG. 19.

At station No. 3, the upper sheet 111 continues to ride within the channel members 119 and 120, and no modification thereof is accomplished at this station. The frame E carries at this station, however, a pair of transverse shafts 121 and 122 which are power-driven and carry cooperative rotary die members. At each end of the shaft 121 there is a rotary die having a cylindrical surface 123 which is reduced to a bevelled surface 124 and tapers gradually thereto as at 125. Each of these rotary die members cooperate with another rotary die member such as 126 that is carried by the lower shaft 122. The rotary dies 126 have a somewhat bevelled end surface 127 which cooperates with the bevelled surface 125 to move the sealing element 118 to extend normal to the immediately adjacent lateral portion of the sheet 114. The surfaces 124 and 128 cooperate to hold the material immediately adjacent the sealing element 118 firmly.

Disposed inwardly of the rotary dies carried at the ends of shafts 121 and 122 are two pairs of cooperating dies which provide the initial break to the sheet 114 at break lines 129 and 130 which eventually become the corners of the duct. The shaft 121 carries a pair of identical rotary dies 131, each of which is characterized by an annular centrally disposed rib 132, and the adjacent surfaces of which slope away therefrom to a diminished radius, as clearly shown in FIG. 19. Cooperating with each of these dies 131 and carried by the shaft 122 in position to form the break lines 129 and 130 is a pair of rotary dies indicated by the numeral 133. Each of these dies is characterized by an annular groove 134, which is centrally located intermediate the ends of the die and by an adjacent tapering surface which increases in radius from the groove toward the outer end of the shaft and is indicated by the numeral 135. As shown, these rotary dies cooperate to provide the initial shaping of the sheet 114 toward a U-shaped construction adapted to be closed eventually by the sheet 111.

Figure 20:
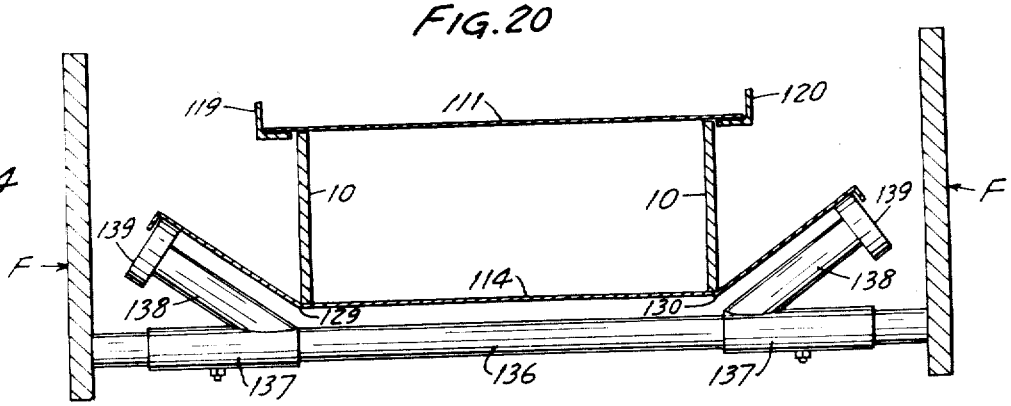
FIG. 20 is a diagrammatic vertical sectional view taken at station o. 6 of the embodiment identified in the description of FIG. 17 and illustrating the rollers or helpers which guide the roller sheet from station No. 3 into the succeeding dies of station No. 5 and initiate the bending of the lateral portions upwardly at the break line in cooperation with the fixed die.

As the sheets 111 and 114 leave station No. 3, they proceed toward station No. 4, which is shown in FIG. 20. Here again the upper sheet 111 continues to be carried by the channel members 119 and 120 without modification thereto. It will be noted, however, that the fixed die members 10 are now disposed above the lower sheet 114 just inwardly of the break lines 129 and 130. At this station there is provided a transverse shaft 136 which rotatably mounts by means of sleeves 137 and spindles 138, a pair of guiding rollers 139 which rotary freely on the spindles. These rollers 139 provide a function comparable to that provided by the rollers 60 in station No. 4 of the first embodiment and, as will be seen by reference to FIG. 20, bring the lateral portion of the sheet 114 upwardly and inwardly and guide the same into the dies at station No. 5, which is shown in FIG. 21.

Figure 21:
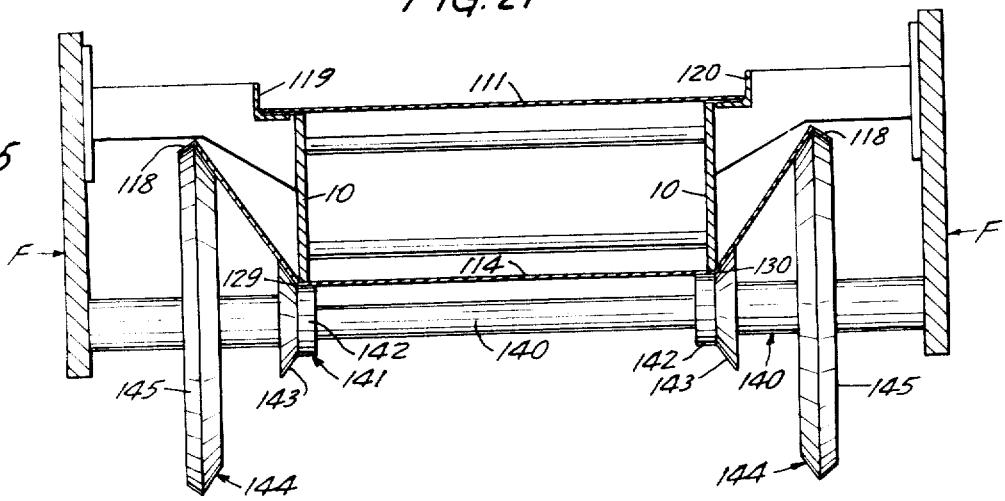
FIG. 21 is a diagrammatic vertical sectional view taken at station No. 5 of the embodiment identified in the description of FIG. 17 and illustrating the cooperation between the rotary dies and the fixed dies to bend the lateral portions sharply upwardly.

At station No. 5 in FIG. 21, the upper sheet 111 is still carried in the channel members 119 and 120 and remains unmodified. The frame F carries a transverse shaft 140 which rotatably mounts a pair of rotary dies such as indicated by the numeral 141. Each of these dies has an annular surface 142 and an outwardly bevelled surface 143 and is positioned so that the latter surface engages the lateral portions of the sheet 114 and bends them upwardly approximately 57° off the plane of the sheet 114. It will be noted that each is positioned so that the annular surface 142 is disposed immediately below the fixed die members 10 and the bevelled surfaces 143 commence at the outer surface of these fixed die members. Also carried by the driven shaft 140 and disposed outwardly of the rotary dies 141 is a pair of guiding disks or rollers indicated generally by the numeral 144. These guiding rollers are bevelled to come to an edge intermediate their axial ends and are shaped so as to engage and complement the edge portion of the sheet 114, the edge 145 of each of these rollers extending into the angle formed by the sealing element 118.

Figure 22:
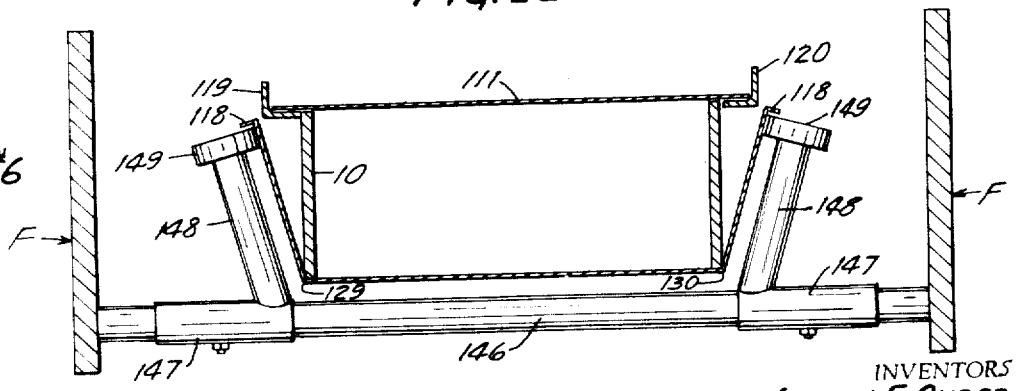
FIG. 22 is a diagrammatic vertical sectional view taken at station No. 6 of the embodiment identified in the description of FIG. 17 and illustrating the use of the roller guides to further bend the lateral portions upwardly and inwardly to a point adjacent the lateral portions of the upper sheet.

As the sheets leave station No. 5 which is shown in FIG. 21, they move to station No. 6 which is shown in FIG. 22. At this station the upper sheet 111 still remains unmodified and is carried by the channel members 119 and 120. A transversely extending shaft 146 is carried by the frame F and mounts by means of a sleeve 147 and a spindle 148, a freely rotatable roller 149 at each of the outer sides of the fixed die 10. The spindles 148 extend upwardly and slightly outwardly and position the rollers 149 so as to bring the lateral portions of the sheet 114 inwardly toward the fixed die members 110. These guide rollers 149 bring the lateral portions to extent approximately 75° from the plane of the sheet 114 and guide the sheet into the mechanism of station No. 7, which is shown in FIG. 23.

The channel members 119 and 120 terminate between stations No. 6 and No. 7 and at station No. 7 sheet 111 is acted upon by a pair of rotary dies indicated generally by the numeral 150. This pair of rotary dies 150 is mounted upon a powered transverse shaft 151, which is carried by the frame F. Each of the rotary die members 150 cooperates with another rotary die member indicated generally by the numeral 152, which is positioned immediately therebelow and supported upon a shaft 153 which likewise is powered and supported by the frame F. Each of the rotary dies 150 has an annular die surface 154 which terminates just short of the lateral edge of the sheet 111 and merges with an outwardly flaring die surface 155, as shown in FIG. 23. The lower dies 152 have an annular surface 156 which cooperates with the annular surface 154 and merges into a diminishing die surface 157 which cooperates with the flaring die surface 155 to form the outer edge portion of the sheet 111 into an angulated lip 158. It will be noted that the break lines 129 and 130 are spaced a distance less than the width of the sheet 111 so that the lip 158 is formed opposite the outer end of the sealing element 118 and extends downwardly thereby. It will also be noted that the inner ends of the rotary dies 152 are bevelled as at 159 to facilitate engagement and passage of the lateral portions of the sheet 114 as the sheet moves through the machine. The rotary dies 152 function to move the lateral portion of the sheet 114 so that they extend normal to the central portion of the sheet and are brought flush against the outer surface of the inner dies 10 to complete the rectangular configuration. They also function to bring the sealing element 118 inwardly so that it will be positioned inwardly of the lip 158.

Figure 23:
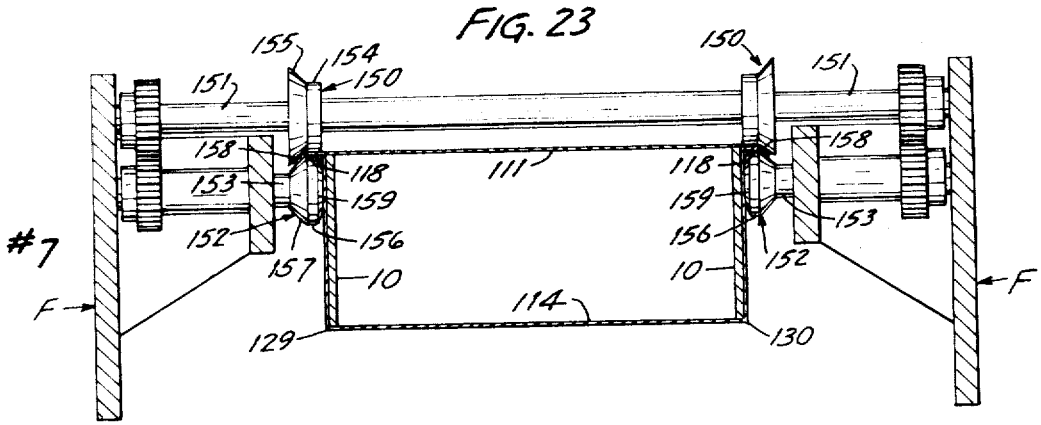
FIG. 23 is a diagrammatic vertical sectional view taken at station No. 7 of the embodiment identified in the description of FIG. 17 and illustrating the cooperation of rotary dies to form the sealing lip at the lateral edge of the upper sheet and the bringing of the lateral portions of the lower sheet to a truly vertical position inwardly of the lip.
Figure 24:
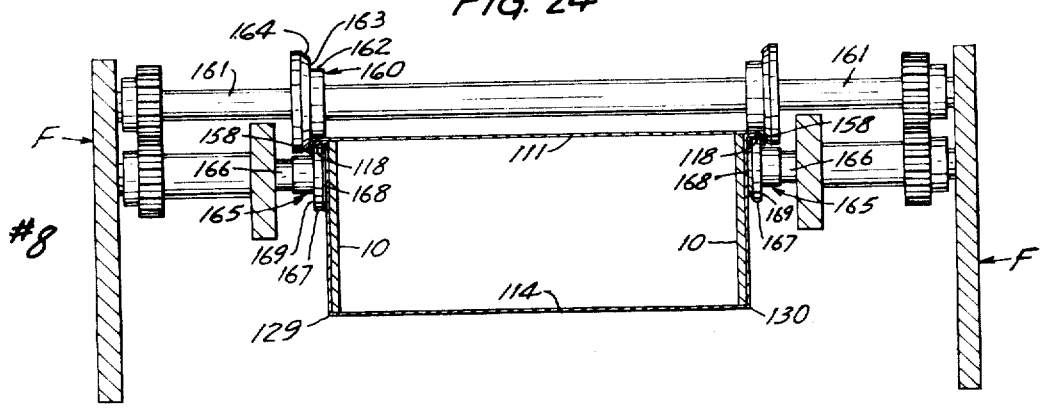
FIG. 24 is a diagrammatic vertical sectional view taken at station No. 8 of the embodiment identified in the description of FIG. 17 and illustrating the cooperation of rotary dies to bring the sealing lip to a vertically extending position at the end of the sealing element of the lower sheet and in position to be sealed.

As the two sheets 111 and 114 move from station No. 7, as shown in FIG. 23, they proceed to station No. 8, which is shown in FIG. 24. It is at this station that the sealing lip 158 is brought to vertically extending position and normal to the sealing element 118. This is accomplished through the use of a pair of rotary die members indicated generally by the numeral 160, which are carried upon a transverse shaft 161 mounted for rotation upon the frame F. This shaft 161 is powered to rotate the two dies 160 at their position directly above the sealing element 118 and lip 158. Each of the dies 160 has an annular surface 162 and an adjacent radially extending surface 163 which extends outwardly therefrom at a posittion just outwardly of the break at the inner end of the lip 158. It also has an adjacent bevelled surface 164 which guides and cams the lip 158 into position where the surface 163 can force a sharp break or bend at the base of the lip. Cooperating with each of the rotary dies 160 is one of a second pair of rotary dies indicated generally by the numeral 165. Each of these dies is carried upon a shaft 166 which in turn is mounted upon the frame F and is likewise power-driven as shown. Each of the dies 165 has an annular die surface 167 which merges with a bevelled surface 168 that extends inwardly therefrom and is adjacent to a radially extending die surface 169. The surface 169 engages the inner surface of the lip 158 and the annular surface 167 cooperates with the annular surface 162 while the bevelled surface 168 guides the lateral portions of the sheet 114 inwardly. It is at this station that the sealing lip is brought to a 90° orientation and the sealing element 118 is brought snugly up against the undersurface of the sheet 111 immediately adjacent this lip preparatory to forming a seam therewith.

Figure 25:
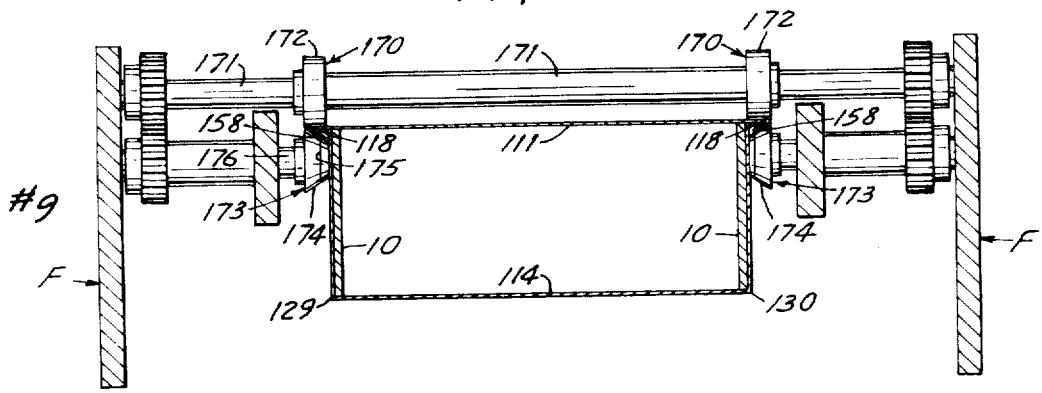
FIG. 25 is a diagrammatic vertical sectional view taken at station No. 9 of the embodiment identified in the description of FIG. 17 and illustrating the cooperation of rotary dies to bring the sealing lip of the upper sheet inwardly and around and below the sealing element of the lower sheet.

As the rectangular configuration shown in FIG. 24 leaves station No. 8, it moves toward station No. 9 which is shown in FIG. 25. It is at this station that the lip 158 is brought inwardly to a partially sealing position. This is accomplished by a pair of rotary dies indicated generally by the numeral 170 and carried by a power-driven shaft 171 which is rotatably mounted on the frame F. The two rotary dies 170 are positioned just outwardly of the two fixed die members 10 and are characterized by an annular surface 172 which bears against the upper surface of the sheet 111 and cooperates with one of a pair of rotary dies indicated generally by the numeral 173. These rotary dies 173 are positioned immediately below one of the dies 170 and are characterized by a frusto-conical camming surface 174 which terminates with a radially extending surface 175. These dies are mounted upon a shaft 176 which likewise is mounted upon the frame F. As these dies engage the lip 158, the end of the lip bears against the radial die surface 175 of the die 173, and the outer surface of the lip 158 is cammed inwardly by the frusto-conical camming surface 175 in cooperation with the annular surface 172 of the die 170. The inner end of the die 173 bears against the outer surface of the lateral portions of the sheet 114 which has now become the side walls of the rectangular duct.

Figure 26:
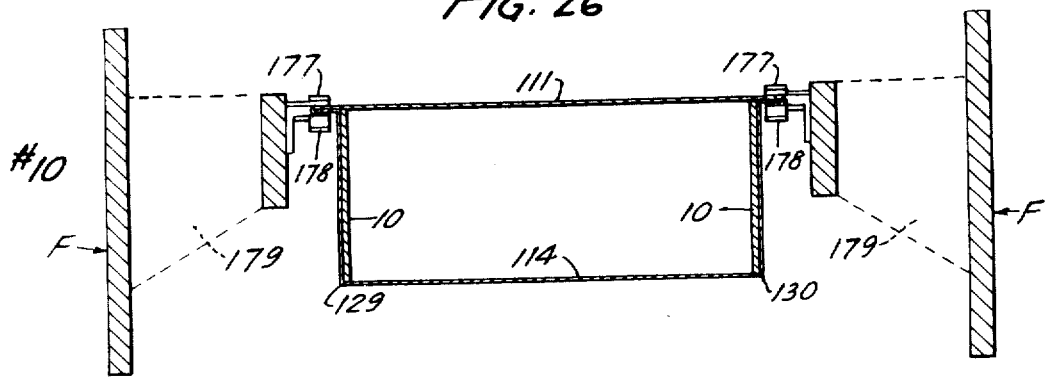
FIG. 26 is a diagrammatic vertical sectional view taken at station No. 10 in the embodiment identified in the description of FIG. 17 and illustrating fixed cams which bring the lip into sealing position beneath and against the sealing element at the edge of the lower sheet.

As the sheets leave station No. 9 which is shown in FIG. 25, they move toward station No. 10, which is shown in FIG. 26. At station No. 10 the edge portions of the sheet 111 pass between a pair of camming members 177 and 178 at each side of the rectangular duct. These camming members are flared similarly to those shown in FIG. 15 and each pair is supported upon the frame F by brackets such as indicated by the numeral 179. The camming members 177 and 178 compress the lip 158 around and upwardly against the underside of the sealing element 118 and cam these elements tightly against the underside of the portion of the sheet 111 which extends laterally beyond the side walls of the duct. This action is highly similar to that described with respect to the preferred embodiment as is accomplished by the structure shown in FIG. 15.

Figure 27:
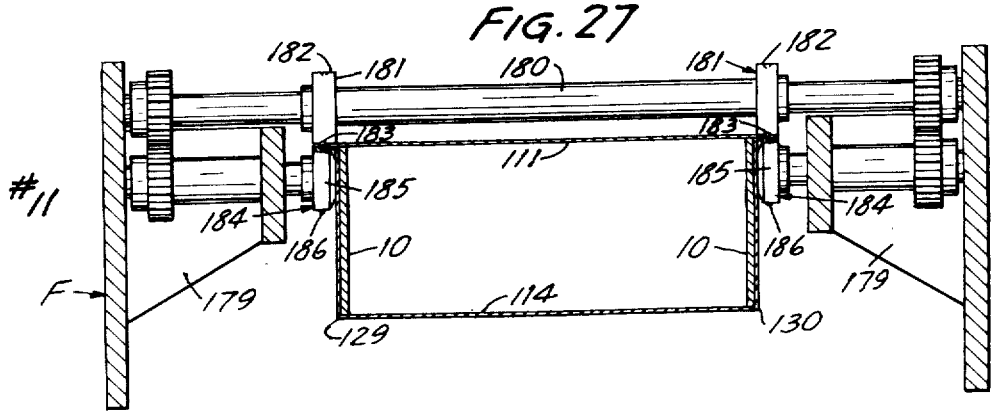
FIG. 27 is a diagrammatic vertical sectional view of the embodiment identified in the description of FIG. 17 and illustrating the manner in which the buttoning dies form the buttons in the seam to lock the sealing elements to each other.

As the duct leaves station No. 10 as shown in FIG. 26, it moves to the finishing station shown in FIG. 27. At this finishing station there is provided a transverse shaft 180 which is mounted upon the frame F for rotation and is powered. It carries a pair of rotary die members indicated generally by the numeral 181 each of which is characterized by an annular surface 182 which has a pair of recesses 183 formed in its outer surface. These rotary dies 181 cooperate with a pair of rotary dies mounted immediately therebelow and identified generally by the numeral 184. These dies likewise have an annular surface 185 which cooperate with the annular surface 182 to further compress the seam formed by the elements 118 and 158 and further carry a pair of oppositely disposed outwardly extending nipples 186 which are adapted to extend into the recesses 183 and form a button in the elements 118, 158, and the portion of the sheet 111 that extends outwardly beyond the side walls of the duct. In this manner, each of these elements is positively locked to the other to prevent separation during handling of the duct. The construction of the button is similar to that shown in FIG. 16.

Figure 28:
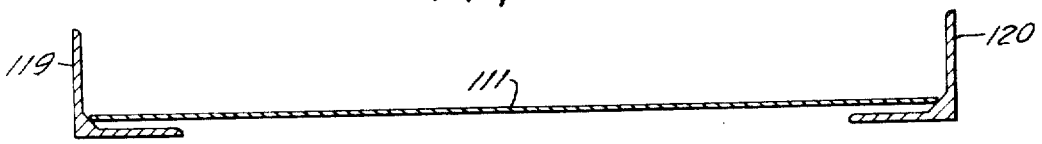
FIG. 28 is a diagrammatic vertical sectional view on an enlarged scale taken through the channel guides which support the upper metal sheet during the formation of the embodiment identified in the description of FIG. 17.

The detailed view of FIG. 28 merely shows the manner in which the sheet 111 rides upon the channels 119 and 120 as hereinbefore described.

Figure 32:
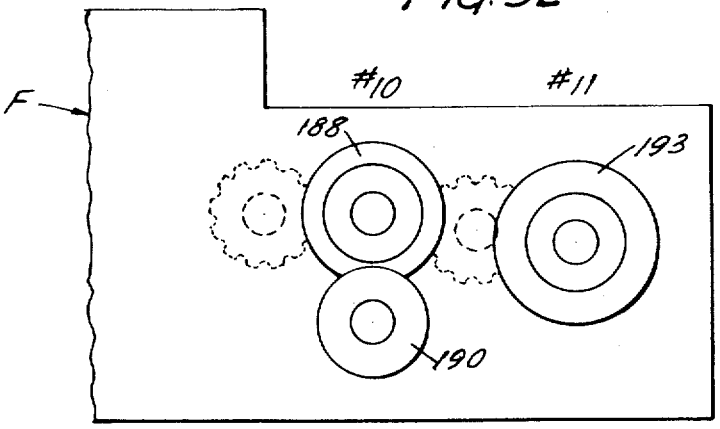
FIG. 32 is a diagrammatic side elevational view showing the means by which the rotary dies illustrated in FIGS. 30 and 31 may be driven by the same drive mechanisms as that shown in FIG. 2.
Figure 30:
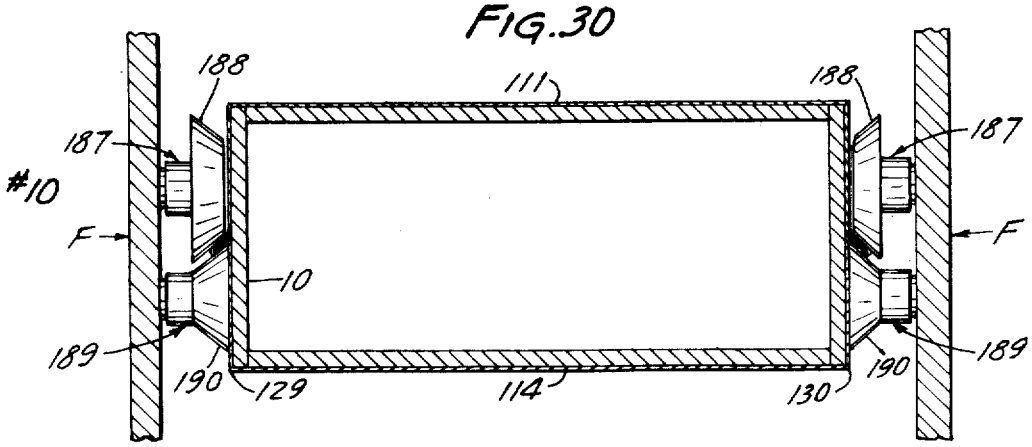
FIG. 30 is a diagrammatic vertical sectional view taken through the embodiment of FIG. 1 and showing at station No. 10 structure which may be added to flatten the seam against the side wall of the duct in the event such is desired.
Figure 31:
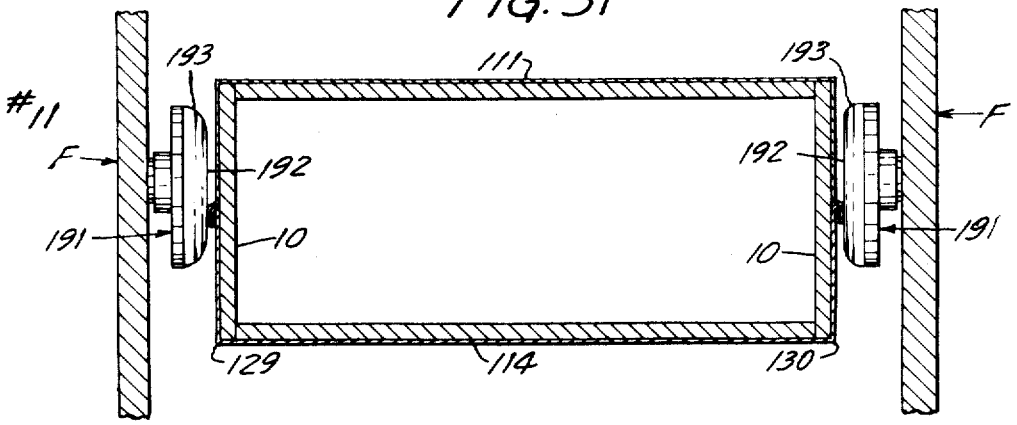
FIG. 31 is a diagrammatic vertical sectional view taken through station No. 11 which may be added to the combined structure shown in FIG. 1 and FIG. 30, illustrating the final step by means of which the seam is flattened against the side wall of the duct.

FIGS. 30–32 are shown herein to disclose the manner in which the seam of the first embodiment may be flattened, if such is desired. It will be readily appreciated that if it is desired to flatten the seam of the second embodiment, it may be accomplished in the same manner by merely moving the rotary die elements upwardly in position to engage the seams at the corners and cam them downwardly. As shown, the seam can be flattened by adding a station 10 immediately forwardly of station No. 9 of the first embodiment, the mechanism being comprised of two pairs of cooperating rotary dies mounted upon the frame F in position to engage the seam, the upper two dies identified by the numeral 187 being provided with a frusto-conical die surface 188 which flares outwardly and cooperates with a lower die indicated generally by the numeral 189 which carries a frusto-conical cooperating die surface 190. The cooperating surfaces 188 and 190 provide an initial bend to the seam so that it extends downwardly at approximately a 45° angle.

From station No. 10 as shown in FIG. 30 the duct moves to station No. 11 as shown in FIG. 31 wherein the seam at each side of the duct engages a flattening die that is mounted for rotation on the frame F. These flattening dies 191 are characterized by a flat end surface 192 and an adjacent bevelled surface 193 which together cooperate to engage and flatten the seam against the extension of the fixed inner die 10 as shown. The dies 188 and 190 and 191 can each be driven by a gear arrangement such as is shown in FIG. 32 which may be incorporated in the drive mechanism disclosed in FIG. 2.

Figure 2:
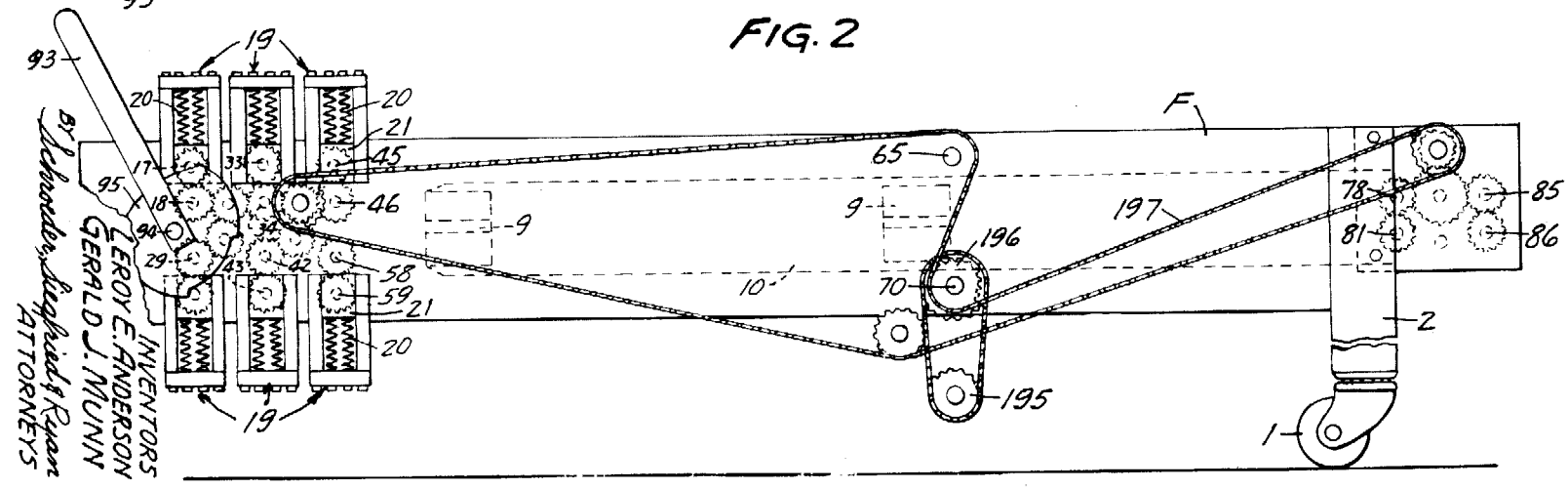
FIG. 2 is a diagrammatic side elevational view of the embodiment shown in FIG. 1.

FIG. 2 shows diagrammatically the gear train provided to drive the various rotary dies hereinbefore described so as to cause the metal sheets to be progressed through the various sequential steps hereinbefore described. A source of power (not shown) such as an electric motor is connected in driving relation to a drive gear 195. This drive gear 195 is connected in driving relation to a second drive gear 196 which is rotatably mounted upon the frame F. A drive chain 197 extends around the drive gear 196 in the manner shown to drive the inter-engaging assembly of gears at the front and rear end of the frame F. The location of the various stations has been indicated in FIG. 2 by identifying the various driving gears with the numerals of the shafts or rotary die members which they drive. It is believed that the interrelation of these gears and the operation of the driving train will be readily appreciated by anyone familiar with chain drives.

From the above it can be readily seen that we have provided a novel machine which utilizes a plurality of rotary dies in such a manner that a pair of flat metal sheets may be fed into one end of the machine and a completely constructed rectangular duct can be taken from the opposite end as a result of an entirely automatic operation. Since the machine is movable, it can be readily taken to any location where it is desired to utilize same, and, in fact, can be positioned adjacent an assembly line in a mobile home manufacturing plant, for example, so as to produce and discharge rectangular ducts of any desired length and feed them directly into the partially constructed home as they pass our machine in the production line. A rectangular duct of any length desired can be produced without difficulty and at a very substantial saving in cost, time and material. Moreover, there are no length limitations, and all that is required to produce a duct of a prescribed length is to provide a preparpared roll of a pair of sheets of that length and feed them into the machine.

It will, of course, be understood that various changes may be made in the form, details, arrangement and proportions of the parts without departing from the scope of this invention which consists of the matter shown and described herein and set forth in the appended claims.

What is claimed is:

1. A method of forming a rectangular air duct in a single continuous operation consisting in:

a. providing a pair of elongated flat metal sheets in spaced parallel relation, b. progressively crimping the inner lateral portions at each side of each of said sheets longitudinally from one of its ends toward the other along a corner line to facilitate bending of the lateral portions of each of such sheets toward the corresponding lateral portions of the other, c. bending simultaneously the lateral portions of such sheets toward each other progressively in increments along their lengths until the lateral portions of one of such sheets abuts the lateral portions of the other throughout their lengths and a rectangular configuration in cross-section is thereby defined, and d. progressively forming an interlocking seam in the abutting lateral portions of such sheets from a point adjacent one of their ends toward the other to positively lock and maintain such sheets in a cooperative rectangular duct-defining relation.

2. The method defined in claim 1, and e. progressively bending the outer lateral portions of said sheets longitudinally along seam lines so as to cause said outer lateral portions to extend substantially normal to their adjacent inner lateral portions and parallel to an in abutting relation to each other when the rectangular configuration has been defined, and f. progressively bending the extreme lateral portions of one of said sheets so as to extend away from and parallel to its supporting inner lateral portions preparatory to the formation of an interlocking seam therefrom.

3. The method defined in claim 2, and finally bending said extreme lateral portions of one of said sheets so as to extend around the outer edge of the extreme lateral portion of the other sheet and along the opposite side thereof in close abutting relation preparatory to the formation of an interlocking seam therein.

4. The method defined in claim 1 wherein forming said interlocking seam consists in simultaneously deforming in a progressive manner along their lengths the abutting lateral portions of said sheets while they are in abutting relation.

5. The method defined in claim 1 wherein forming said interlocking seam consists in simultaneously deforming in a progressive manner along their lengths the abutting lateral portions of said sheets at points spaced along substantially the entire lengths of said abutting portions to cause the deformations produced therein to lock such portions to each other.

6. The method defined in claim 1 wherein each of the crimping and bending steps set forth therein is performed sequentially and progressively upon such sheets from one of their ends toward and to the other end.

7. The method defined in claim 1 wherein each of said crimping, bending, and forming operations is performed sequentially and progressively upon such sheets from one of their ends toward and to the other end.

8. The method defined in claim 1 wherein each of the crimping operations set forth therein is accomplished by passing said sheets longitudinally through cooperative rotary crimping members from one of their ends toward and to the other end.

9. The method defined in claim 1 wherein each of the bending operations set forth therein is accomplished by passing said sheets longitudinally from one of their ends toward and to the other end between cooperative rotary bending members.

10. The method defined in claim 1 wherein the seam forming operations set forth therein are accomplished by passing said sheets longitudinally from one of their ends toward and to the other end between cooperative rotary die members.

11. The method defined in claim 1 wherein the crimping and bending operations set forth therein are accomplished by passing such sheets longitudinally from one of their ends toward and to the other end between cooperative rotary members.

12. The method defined in claim 1 wherein the crimping, bending, and forming operations set forth therein are accomplished by passing such sheets longitudinally from one of their ends toward and to the other end between cooperative rotary members.

13. A method of forming a duct having a rectangular cross section in a single continuous operation consisting in:

a. providing a pair of elongated flat metal sheets in spaced parallel relation, b. progressively crimping a sharp corner line in the inner lateral portion of each of said sheets at each of its sides, c. progressively bending the lateral portions of each of said sheets at its corner lines toward each other in increments along their lengths until the lateral portions of one of said sheets extend adjacent to and along the lateral portions of the other throughout their lengths and said sheets thereby cooperatively define a rectangular configuration in cross section, and d. progressively securing such adjacent lateral portions of the one such sheet to those of the other along the length of said sheets in order to maintain said sheets in cooperative rectangular duct-defining relation.

14. A method of forming a rectangular air duct in a single continuous operation consisting in:

a. providing a pair of elongated flat metal sheets in spaced parallel relation, b. progressively crimping the inner lateral portions of said sheets longitudinally from one of their ends to the other along corner lines to facilitate bending of the lateral portions of such sheets toward each other, c. simultaneously bending the lateral portions of such sheets toward each other progressively in increments along their lengths until the lateral portions of one of such sheets overlaps the lateral portions of the other throughout their lengths and a rectangular configuration in cross section is thereby defined, and d. progressively forming an interlocking seam in the overlapping lateral portions of such sheets from one of their ends to the other to positively lock and maintain such sheets in a cooperative rectangular duct-defining relation.

15. The method defined in claim 14, and e. progressively bending the outer lateral portions of said sheets longitudinally along seam lines so as to cause said outer lateral portions to extend substantially normal to their adjacent inner lateral portions and parallel to and in abutting relation to each other when the rectangular configuration has been defined, and f. progressively bending the extreme lateral portions of one of said sheets so as to extend away from and parallel to its supporting inner lateral portions prior to the formation of an interlocking seal therefrom.

16. The method defined in claim 15, and finally bending said extreme lateral portions of one of said sheets so as to extend around the outer edge of the extreme lateral portion of the other sheet and along the opposite side thereof in close abutting relation prior to the formation of an interlocking seam therein.

17. The method defined in claim 14 wherein forming said interlocking seam consists in simultaneously deforming in a progressive manner along their lengths the overlapping lateral portions of said sheets while they are in abutting relation.

18. The method defined in claim 14 wherein forming said interlocking seam consists in simultaneously deforming in a progressive manner along their lengths the overlapping lateral portions of said sheets at points spaced along substantially the entire lengths of said overlapping portions to cause the deformations produced therein to lock such portions to each other.

19. Method of forming a rectangular-duct in a single continuous operation consisting in a. providing a pair of elongated flat metal sheets in spaced parallel relation, b. progressively moving longitudinally the latteral portions of each said sheets at each of its sides through a rotary crimping die to form a pair of spaced sharp corner lines therein extending substantially throughout the length of said sheet, c. progressively moving the lateral portions of said sheets against and past a series of bending rollers and thereby progressively bending such lateral portions toward each other until the lateral portions of one of said sheets abuts the corresponding lateral portions of the other throughout the length of said sheets to cooperatively define a rectangular configuration in cross section, and d. progressively securing such adjacent lateral portions of the one such sheet to those of the other along the length of said sheets to maintain such sheets in cooperative rectangular-duct defining relation.

20. The method defined in claim 1 wherein said bending operation includes the step of progressively camming the lateral portions of such sheets toward each other in increments along their lengths.

21. The method defined in claim 1 wherein said bending operation includes camming the lateral portions of such sheets toward each other progressively in increments along their lengths until the lateral portions of one of such sheets abuts the lateral portions of the other throughout their lengths and a rectangular configuration in cross-section is thereby defined.

22. The method defined in claim 1 wherein said bending operation includes camming the lateral portions of such sheets toward each other progressively in increments along their lengths, and e. progressively bending the outer lateral portions of said sheets longitudinally along seam lines so as to cause said outer lateral portions to extend substantially normal to their adjacent inner lateral portions and parallel to and in abutting relation in part at least to each other when the rectangular configuration has been defined.

*23. A method of forming a rectangular air duct in a single continuous operation consisting in:*

*(a) providing a pair of elongated flat metal sheets in spaced parallel relation,*

*(b) progressively crimping the inner lateral portions at each side of at least one of such sheets longitudinally from a point adjacent one of its ends toward the other along a corner line to facilitate bending of the lateral portions of such crimped sheet toward the corresponding lateral portions of the other sheet,*

*(c) bending the lateral portions of such crimped sheet toward the lateral portions of the other sheet progressively in increments along its length until the lateral portions of each of such sheets overlaps the lateral portions of the other of such sheets along their lengths and a rectangular configuration in cross-section is thereby defined, and*

*(d) progressively forming an interlocking seam in the overlapping lateral portions of such sheets from a point adjacent one of their ends toward the other to positively lock and maintain such sheets in a cooperative rectangular duct-defining relation.*

*24. The method defined in claim 23 and bending the extreme lateral portions of one of such sheets so as to extend around the outer edge of the extreme lateral portion of the other of such sheets and along the opposite side thereof in close overlapping relation preparatory to the formation of an interlocking seam therein.*

*25. The method defined in claim 23 wherein forming said interlocking seam includes simultaneously deforming in a progressive manner along their lengths the overlapping lateral portions of each of said sheets while they are in overlapping relation.*

*26. The method defined in claim 23 wherein each of the crimping and bending steps set forth therein is performed sequentially and progressively upon such crimped sheet from one of its ends toward and to the other end.*

*27. The method defined in clam 23 wherein each of said crimping, bending, and forming operations is performed sequentially and progressively upon such crimped sheet from one of its ends toward and to the other end.*

*28. The method defined in claim 23 wherein said bending operation includes the step of progressively camming the lateral portions of such crimped sheet toward the corresponding lateral portions of the other such sheet in increments along their length.*

*29. The method defined in claim 23 wherein the bending operations set forth therein is accomplished by passing such crimped sheet longitudinally from one of its ends toward and to the other end between opposed camming members which bend the lateral portions of such crimped sheet toward the lateral portions of the other sheet.*

*30. The method defined in claim 23 wherein said seam forming operation includes simulaneously deforming in a progressive manner along their lengths the overlapping lateral portions of said sheets in such a manner as to cause local areas of the overlapping portion of one of such sheets to extend into the plane of the adjacent overlapping portion of the other of such sheets.*

*31. The method defined in claim 23 wherein said progressive bending operations are conducted simultaneously at opposite sides of such crimped sheet in substantially equal increments.*

*32. The method defined in claim 23 wherein said progressive seam forming operations are conducted simultaneously and oppositely at opposite sides of such sheets.*

*33. The method defined in claim 23 wherein said progressive crimping, bending, and seam-forming operations are conducted simultaneously along both sides of such crimped sheet.*

*34. A method of forming a rectangular air duct in a single continuous operation consisting in:*

*(a) providing a pair of elongated flat metal sheets in spaced parallel relation,*

*(b) progressively crimping the inner lateral portions at each side of one of such sheets longitudinally from a point adjacent one of its ends toward the other along a corner line to facilitate bending of the lateral portions of such crimped sheet toward the corresponding lateral portions of the other sheet,*

*(c) bending the lateral portions of such crimped sheet toward the correspondng lateral portions of the other sheet progressively in increments along its length until the lateral portions of each of such sheets overlaps the lateral portions of the other of such sheets along their lengths, and*

*(d) progressively forming an interlocking seam in the overlapping lateral portions of such sheets from a*

*point adjacent one of their ends toward the other to positively lock and maintain such sheets in a cooperative rectangular duct-defining relation.*

References Cited

The following references, cited by the Examiner, are of record in the patented file of this patent or the original patent.

UNITED STATES PATENTS

| | | | |
|---|---|---|---|
| 489,498 | 1/1893 | Pruden | 72—52 |
| 2,502,012 | 3/1950 | Kinkead | 228—15 |
| 2,682,850 | 7/1954 | Close | 72—51 |
| 3,250,077 | 5/1966 | Ede | 113—54 |
| 3,457,629 | 7/1969 | Janecek | 29—514 |
| 3,407,640 | 10/1968 | Lipp | 72—181 |
| 3,505,719 | 4/1970 | O'Malley et al. | 29—200 B |

FOREIGN PATENTS

| | | | |
|---|---|---|---|
| 723,908 | 2/1955 | Great Britain | 72—52 |
| 385,642 | 11/1923 | Germany | 113—54 |

RICHARD J. HERBST, Primary Examiner